United States Patent Office

3,393,161
Patented July 16, 1968

3,393,161
PROCESS FOR PREPARING AMINOPLAST RESIN FOAM
Robert P. Avis, Chester, Pa., and Thomas P. Czepiel, Dearborn, Mich., assignors to Scott Paper Company, Philadelphia, Pa., a corporation of Pennsylvania
No Drawing. Filed July 16, 1965, Ser. No. 472,666
10 Claims. (Cl. 260—2.5)

ABSTRACT OF THE DISCLOSURE

A simplified process is disclosed for preparing aminoplast resin foams which possess physical characteristics adapting them for utilization as components for paper, paperboard, and paper stocks. Aqueous solutions of urea and formaldehyde are substantially simultaneously mixed and aerated along with an acid hardening agent and a surfactant under certain conditions of temperature and concentration to form a foam. A significant feature of this process is the avoidance of any intermediate condensation or prepolymerization step. The resulting foam is subjected to heat and allowed to gel and cure to form a stable aminoplast resin foam.

---

This application is a continuation-in-part of U.S. patent application, Ser. No. 159,465, filed Dec. 14, 1961, entitled "Preparation of Aminoplast Resin Foam."

This invention relates to foamed aminoplast resins and, more particularly, to a simplified process for the preparation thereof.

Recent developments in the papermaking art have involved the incorporation of synthetic resins with the cellulose fibers in the paper "furnish." Many resins have been employed in this fashion. Some have been designed to impart wet strength, flame proofing, grease resistance and comparable characteristics to the end products. Also, some cured resins, in the form of discrete particles, have been employed as fillers. More recently it has been discovered that certain resins can be converted into semi-rigid foams, with cellulated structures exhibiting novel characteristics.

The preparation of these foams has, in the past, been effected in two stages. In the first stage, the aldehyde and amine components are partially polymerized to form a soluble, intermediate condensation product of relatively low molecular weight. In the second stage, this intermediate resin is further polymerized during a foaming operation to yield a cellulated condensation product. The polymerization is completed during a post-cure period to yield a cross-linked, insoluble resin foam.

Regulation of the density of the foaming mixture by aeration thereof enables control of the density of the resin foam within limits of from 0.2 to 1.5 pounds per cubic foot. Additionally, it has been noted that the degree of aeration and matrix agitation affects the fineness of the ultimate foam which can have as many as $10^5$ cells per cubic centimeter. Urea-formaldehyde resins, melamine-formaldehyde resins, mixed melamine-urea-thiourea condensation products with formaldehyde and phenolformaldehyde resins are processed in this fashion to produce lightweight foams. Other foamed resins are disclosed in U.S. Patents Nos. 2,273,367, 2,384,387, 2,559,891 and 2,813,780 and British Patent Nos. 768,562 and 773,809.

In the usual two-stage processes great care must be taken to prepare an intermediate resin of carefully defined physical and chemical products. Such physical properties as solids content, viscosity, and water solubility must be maintained within narrow limits so that the prepolymer or intermediate resin can be properly diluted and prepared for foaming. Similarly, the chemical reactivity of the prepolymer must be regulated so that it will gel uniformly and at the proper rate during foaming. If, for example, the reactivity of the intermediate resin is too high, it will gel very rapidly during foaming and cause the foaming equipment to become obstructed with partially gelled resin. Moreover, highly reactive resins tend to yield foams which contain nodules or gritty particles of the aminoplast material. When, on the other hand, the intermediate resins have low reactivities, the foam created during the second stage will have a tendency to collapse prior to gellation yielding a product of much higher density than is desired.

Because resin properties are interdependent, it is necessary to control carefully the composition of the resin and the conditions under which it is prepared. Important composition variables include: urea to formaldehyde ratio, methyl alcohol concentration, ammonia concentration, and acid catalyst concentration. Process variables which must be controlled include: polymerization time, temperature and pH.

Because of the complexities of the foam producing operation, maintenance of quality control has been difficult and maximum efficiencies have not been realized. The handling of the intermediate resin condensates or prepolymers has also occasioned procedural problems. In view of the above, it can be seen that it would be very desirable to devise a method of forming an aminoplast resin foam without the formation of a partial condensation product or prepolymer and which would be suitable for use as a paper filler. Surprisingly, this has now been accomplished.

It is, therefore, a principal object of the present invention to provide a process for preparing aminoplast resin foams in a unitary operation without requiring the formation of an intermediate resin condensate or prepolymer. It has been found that acidic solutions of urea and formaldehyde can be substantially simultaneously mixed and foamed in the presence of a surfactant, and the resulting aminoplast resin foam can be fixed by treatment with an acid catalyst, all without the preparation of any intermediate resin or prepolymer.

Aminoplast resin foams which are to be used as fillers in a paper furnish must possess certain physical characteristics such as pore size, hardness, etc. These requirements, of course, will vary depending in part upon the particular type and grade of paper desired, but once this is established, the physical characteristics must be closely controlled.

It has not been possible by the prior known processes of forming aminoplast resin foams, to consistently and reliably control these properties to anywhere near the degree desired. One reason for this resides in the fact that the step of forming a prepolymer or intermediate condensation product of the urea and formaldehyde was difficult to perform. By presently known techniques, it is slow and laborius to determine by analysis how far a given polymerization reaction has progressed, and the control of it is difficult since polymerization depends on so many conditions; furthermore, the reaction, once begun, is difficult to stop at any precise stage or instant of time.

Therefore, another object of the present invention is to provide a simplified process for preparing aminoplast resin foams which possess physical characteristics adapting them for utilization as components for paper, paper board, and paper stocks.

The invention accomplishes the above by setting forth the physical concentrations of reactants involved which, when handled in accordance with the method of the invention, free from any intermediate condensation product step or prepolymerization step, can be employed reliably to produce aminoplast resin foams which are ideal for use as a filler material to be employed in a paper furnish for making paper stock.

Other objects and advantages of the present invention will become apparent from the following detailed description of certain preferred embodiments thereof which are presented for purposes of illustration and are not intended to limit the scope of the invention.

Amines, particularly ureas, and aldehydes in aqueous solution undergo complex exothermic chemical reactions, starting with a molecular condensation and continuing through progressive polymerizations, with no sharply defined transition point therebetween. The primary condensates are water-soluble but as the weight and complexity of the molecule increases, the reaction mixture becomes syrupy and gelatinous. If the aqueous solution of the primary condensate is whipped or frothed by aeration in the presence of a hardening agent, substantially simultaneous and continuing polymerization creates a stabilized foam which is thereafter hardened by curing. Continuous operations have been possible in the past. Thus, if an aqueous solution of primary condensate or a prepolymer, which is an intermediate condensation product of urea and formaldehyde, could be aerated and fed to a special mixing nozzle, barring clogging problems due to its consistency, it might be combined with the hardening agent immediately before being discharged in its cellulated state for final cure. However, and most significantly as previously noted, the preparation of the primary condensate or prepolymer is extremely troublesome and the elimination of this phase of aminoplast foam making in which the present invention now succeeds has long been considered to be highly desirable.

It has now been found, to the great surprise of those skilled in the art, that aqueous solutions of urea and formaldehyde can be substantially simultaneously mixed and aerated along with addition of an acid hardening agent and a surfactant under certain conditions of temperature and concentration so that when the resulting foam is subjected to heat, it will gel and cure to form a stable aminoplast resin foam which is ideal for use as a filler material for use in a paper furnish. Since no polymerization takes place prior to the reactants reaching the nozzle, the danger of clogging is reduced since all of the reactants being fed into the mixing nozzle have a relatively low viscosity and are free-flowing.

In some instances, it has been found desirable to control the methanol content of the reaction between urea and formaldehyde. In such cases, paraformaldehyde is used since commercial formaldehyde solutions having a concentration of 37% usually containing from 7% to 12% methanol. Paraformaldehyde is commercially available in a powder form and passes into the solution so slowly at normal temperatures that it has been found preferable to heat it up to about 50° C. or higher so as to dissolve the paraformaldehyde into water to form an aqueous formaldehyde solution having the desired concentration and methanol content.

Depending upon the physical nature of the mixing device or chamber, and the number of feed entrances into it, it may be desirable to combine the aqueous solution of urea with the aqueous solution of formaldehyde prior to the actual foaming operation. In this case in order to prevent any condensation or polymerization from occurring prior to foaming, the pH of the mixed solution is adjusted to between about 7 and about 8.5 and, preferably, to about 8 by adding some sodium hydroxide. An addition reaction does occur between urea and formaldehyde when mixed at room temperatures and will also occur under the above higher temperature conditions to form monomethylol and dimethylol ureas. However, this is inconsequential and has no effect on the process of the invention.

Regardless of the approach taken relative to the preparation of basic solutions prior to foaming, it should be clearly understood that no condensation reactions or polymerization occurs prior to the addition of the acid hardening agent and the surfactant. Therefore, it is clear that the invention provides a unitary operation for forming aminoplast resin foams and avoids the indefiniteness of the prior art processes by providing for one complete polymerization only during the foaming step which occurs substantially simultaneously with the foaming process and therefore avoids the partial polymerization and intermediate cessation of this reaction which has resulted in the above-mentioned disadvantages.

It should be clearly understood that the above solutions of urea and formaldehyde, respectively, are unreacted and that no polymerization has occurred and no intermediate condensation product has been formed prior to such mixing and aeration. The separate or combined urea and formaldehyde solutions are inserted into a mixing chamber or foaming device along with sufficient acid hardening agent to alter the pH to a level sufficient to form a hard stable foam and along with sufficient surfactant to attain the desired degree of foaming. These solutions are all mixed and aerated with compressed air and the resulting foam is then gelled and subjected to a temperature high enough to cure and harden the aminoplast resin foam. A temperature of from about 75° C. to about 100° C. maintained for a time period of several hours has been found to be satisfactory for this purpose. The time period depends to some extent on the amount of foam to be cured.

The preferred molar ratio of formaldehyde to urea is about 2.17:1 but, as is well known to the art, this ratio may range from as low as about 2 to as high as about 2.5:1 without detrimental effect upon the final resin foam. Similarly, while it is preferred to include ammonia in the reaction mixture in a molar ratio with respect to the urea content of about 0.145:1, as illustrated by the following examples, this addition is not essential and satisfactory operation has been achieved with ammonia additions in a ratio of less than 0.5:1 and without any ammonia addition as illustrated by Example 4. The presence of methyl alcohol is also optional but when used, and particularly when used in combination with ammonia, it should be in a molar ratio to the urea of not greater than 0.3:1. Too much methyl alcohol slows down the rate of polymerization, thereby tending to cause the foam to collapse.

Of more importance to the successful accomplishment of the inventive concept is the regulation of the acid hardening agent added to the mixture. Phosphoric acid or any other mineral acid may be used satisfactorily as an acid hardening agent with each liter of the urea-formaldehyde solution. A lesser amount of the acid reduces the rate of foam gellation with the result that the froth or foam collapses before it has had an opportunity to set. Larger acid additions accelerate polymerization reactions and/or insolubilization. However, on curing, acid hydrolysis of the foam occurs, deteriorating the foam.

Satisfactory results have been obtained by using a phosphoric acid solution of a concentration between about 0.3 M to about 6 M and having a volume ratio with respect to the combined urea-formaldehyde solution of from about 1:0.60 to about 1:1.4, but preferably this ratio should be about 1:1. Best results have been obtained employing an aqueous phosphoric acid solution having a concentration of between about 0.66 M to about 2 M.

Stronger acidic hardening solutions increase the rate of gellation of the foam but at the same time produce more friable materials which impart harshness to paper products in which they are incorporated. It is also to be noted that as the rate of foam gellation is accelerated, the percentage of insolubles present in the foam is diminished.

The amount of water, or conversely the solids content, of the foaming mixture is also of importance. In order that a flexible, resilient foam will be obtained it is preferable that the solids content represent 21% or less of the weight of such reaction mixture. Higher solids contents produce brittle, friable foams of little integral strength. In a unitary continuous operation such as the method of the present invention, it is desirable to have the reaction occur as quickly as possible once it has begun without sacrificing the quality of the resulting product. For this reason, the solids content of the resin solution or combined urea-formaldehyde solutions is preferably initially from about 42% to about 50% and then the aqueous solution of acid hardening agent supplies the remaining water to reduce the solids content to about 21% of the total reaction mixture. This assures faster mixing of the acid solution with the resin and results in an overall decrease in reaction time required.

It is also preferred that the temperature of the foaming mixture after combination with the hardening agent be maintained at approximately 50° C. until the foam has set. At lower temperatures, the foam collapses prior to gellation. Once it issues from the nozzle, it is then subjected to a temperature of from about 75° C. to about 100° C. as described above.

The following examples are illustrative of the present invention:

EXAMPLE 1

A mixture of 1440 parts of urea, 1560 parts of paraformaldehyde, 10 parts of 4 M sodium hydroxide solution and 2775 parts of water was placed in a glass container of adequate size and agitated for 5 minutes. Then 247 parts of 24% ammonium hydroxide were added and the mixture was warmed slightly and held for 30 minutes to assure complete dissolution of the urea and paraformaldehyde. The mole ratio of ammonia to urea was 0.145:1.

To 1000 parts of the above solution which contained about 42% nonvolatile solids, 100 parts of 34% Teepol 610 was added, and the mixture, heated to 50° C., was continuously aerated with compressed air. 1000 parts of 0.66 M phosphoric acid solution was injected into the foam during its passage through a mixing nozzle consisting of a spiral insert in a close fitting Teflon tube. The foam as it discharged from the nozzle was collected in wire mesh containers and cured for 3 hours at 85° C. and 40% relative humidity. The cured foam containing about 82.9% of insolubles, was disintegrated, deaerated, and blended with bleached sulfite pulp in the ratio of 3 parts disintegrated foam to 7 parts pulp, and handsheets were formed, in order to establish the physical characteristics of the foam and its applicability as a component of paper stock. The handsheets exhibited excellent uniformity and surface softness.

EXAMPLE 2

A mixture of 1200 parts of urea, 1300 parts of paraformaldehyde, 8 parts of 4 M sodium hydroxide solution, 2278.8 parts of water, and 36.2 parts of 99% methyl alcohol was placed in a glass reaction flask of adequate size and agitated for 5 minutes. Then 206 parts of 24% ammonium hydroxide were added and the mixture was warmed slightly and held for 30 minutes to assure complete dissolution of the urea and paraformaldehyde. The final solution was then ready for conversion into foam.

The mole ratio of formaldehyde to urea in this example was 2.17:1 and the amount of methyl alcohol was approximately 1% based on the total weight of paraformaldehyde, water, and methyl alcohol. The mole ratio of ammonia to urea was about 0.145:1.

This solution was foamed with several different acid hardening agents, the foam was cured and disintegrated and the fragmentary agglomerates blended with sulfite pulp as in Example 1. The acid strength used in the foaming process affected the foam and therethrough the ultimate paper as follows:

| Acid | Rate of Gellation | Handsheet Feel |
| --- | --- | --- |
| 2 M $H_3PO_4$ | Moderate | Good. |
| 1 M $H_3PO_4$ | Slow | Do. |
| 0.66 M $H_3PO_4$ | | Slightly Lumpy. |

EXAMPLE 3

A urea formaldehyde solution was prepared as in Example 2 with the exception that 2127 parts of water, and 190 parts of 99% methyl alcohol was used.

The mole ratio of formaldehyde to urea in this example was 2.17:1 and the amount of methyl alcohol was approximately 5% based on the total weight of paraformaldehyde, water, and methyl alcohol. The mole ratio of ammonia to urea was 0.145:1.

This solution was foamed, and the resulting foam processed as in Example 1. The acid strength used in the foaming process was varied with the following results:

| Acid | Rate of Gellation | Handsheet Feel |
| --- | --- | --- |
| 2 M $H_3PO_4$ | Slow | Good. |
| 1 M $H_3PO_4$ | Very Slow | Lumps. |
| 0.66 M $H_3PO_4$ | do | Do. |

EXAMPLE 4

A mixture of 1200 parts of urea, 1300 parts of paraformaldehyde, 8 parts of 4 M sodium hydroxide solution and 2518 parts of water was placed in a glass container of adequate size and heated (while mixing) to 70° C. for 30 minutes to assure that the urea and paraformaldehyde has dissolved completely and thereafter held at room temperature until employed in the foaming.

The solution was foamed, cured, and blended with sulphite pulp as in the previous examples. The handsheets exhibited satisfactory uniformity and surface softness.

EXAMPLE 5

A 50% solution of formaldehyde was prepared containing 1 part of 4 M sodium hydroxide to every 162.5 parts of formaldehyde and a 50% solution of urea was prepared containing 1 part of 34% Teepol 610 to every 12 parts of urea. Each of these solutions were heated to 50° C. in separate containers and equal amounts of each were simultaneously fed at a substantially equal and constant rate into a mixing chamber or nozzle. Also, at the same time a 0.66 M phosphoric acid solution was injected into the mixing chamber in the ratio of 1 part of acid to every 0.5 part of urea solution.

The resulting solution in the mixing chamber was continuously aerated with compressed air and a foam was produced which was discharged from the mixing nozzle, collected in a wire mesh, container and cured for 3 hours at 85° C. and 40% relative humidity. The cured foam disintegrated, deaerated, and blended with bleached sulphite pulp in the ratio of 3 parts disintegrated foam to 7 parts pulp, and handsheets were formed. The handsheets had good uniformly and excellent surface softness.

EXAMPLE 6

The procedure of Example 5 was repeated using a 50% solution of formaldehyde containing 0.027 part of methyl alcohol to every part of formaldehyde, as well as the sodium hydroxide. In addition, the 50% urea solution contained 0.17 part of 24% ammonium hydroxide to every part of urea, as well as the Teepol. Results were obtained similar to those obtained in Example 5.

From the above, it can be seen that the invention provides a new and novel unitary process for forming aminoplast resin foams and, in addition, provides a method for forming such foams which have the desirable physical and chemical properties which make them more ideal for use as fillers in paper furnishes for ultimate manufacture of paper products having superior properties such as "hand feel." It will be apparent that many modifications can be made in the invention without departing from its spirit and scope.

What is claimed is:

1. A process for preparing an aminoplast resin foam which comprises substantially simultaneously mixing an aqueous solution of urea, an aqueous solution of formaldehyde, an acid hardening agent and a surfactant together at a temperature of about 50° C. and aerating the resulting solution during said mixing to produce a froth, said urea solution having a molar ratio with respect to said formaldehyde solution of from about 1:2 to about 1:2.5, and subjecting such acidified froth to a temperature of from about 75° C. to about 100° C. to effect its gellation and cure.

2. A process for preparing an aminoplast resin foam which comprises substantially simultaneously mixing an aqueous solution of urea, an aqueous solution of formaldehyde, an aqueous solution of an acid hardening agent and a surfactant together at a temperature of about 50° C. and aerating the resulting solution during said mixing to produce a froth, said urea solution having a molar ratio with respect to said formaldehyde solution of from about 1:2 to about 1:2.5, said acid hardening agent aqueous solution having a volume ratio with respect to said combined urea and formaldehyde solutions of from about 1:0.60 to about 1:1.4, and subjecting such acidified froth to a temperature of from about 75° C. to about 100° C. to effect its gellation and cure.

3. A process for preparing an aminoplast resin foam which comprises substantially simultaneously mixing an aqueous solution of urea, an aqueous solution of formaldehyde, an aqueous solution of an acid hardening agent and a surfactant together at a temperature of about 50° C. and aerating the resulting solution during said mixing to produce a froth, said urea solution having a molar ratio with respect to said formaldehyde solution of from about 1:2 to about 1:2.5, said aqueous solution of acid hardening agent having a phosphoric acid concentration of from about 0.3 M to about 6 M and having a volume in a ratio with respect to the combined volume of said urea and formaldehyde solutions of from about 1:0.60 to about 1:1.4, and subjecting such acidified froth to a temperature of from about 75° C. to about 100° C. to effect its gellation and cure.

4. A process for preparing an aminoplast resin foam which comprises substantially simultaneously mixing an aqueous solution of urea, an aqueous solution of formaldehyde, an aqueous solution of an acid hardening agent and a surfactant together at a temperature of from about 50° C. and aerating the resulting solution during said mixing to produce a froth, said urea solution having a molar ratio with respect to said formaldehyde solution of from about 1:2 to about 1:2.5 and containing ammonia in a molar ratio with respect to said urea of less than 0.5 to 1, said acid hardening agent having a volume ratio with respect to said combined urea and formaldehyde solutions of from about 1:0.60 to about 1:1.4, and subjecting such acidified froth to a temperature of from about 75° C. to about 100° C. to effect its gellation and cure.

5. A process for preparing an aminoplast resin foam which comprises simultaneously mixing an aqueous solution of urea, an aqueous solution of formaldehyde, an aqueous solution of an acid hardening agent and a surfactant together at a temperature of about 50° C. and aerating the resulting solution during said mixing to produce a froth, said urea solution having a molar ratio with respect to said formaldehyde solution of from about 1:2 to about 1:2.5, said aqueous solution of acid hardening agent having a phosphoric acid concentration of from about 0.66 M to about 2 M and having a volume in a ratio with respect to the combined volume of said urea and formaldehyde solutions of from about 1:0.60 to about 1:1.4, and subjecting said acidified froth to a temperature of from about 75° C. to about 100° C. to effect its gellation and cure.

6. A process for preparing an aminoplast resin foam which comprises substantially simultaneously mixing an aqueous solution of urea, an aqueous solution of formaldehyde, an aqueous solution of phosphoric acid hardening agent and a surfactant together at a temperature of about 50° C. and aerating the resulting solution during said mixing to produce a froth, said urea solution having a molar ratio with respect to said formaldehyde solution of from about 1:2 to about 1:2.5, said aqueous solution of phosphoric acid hardening agent having a phosphoric acid concentration of about 1 M and having a volume in a ratio with respect to the combined volume of said urea and formaldehyde solutions of about 1 to 1, and subjecting such acidified froth to a temperature of from about 75° C. to about 100° C. to effect its gellation and cure.

7. A process for preparing an aminoplast resin foam which comprises substantially simultaneously mixing an aqueous solution of urea, an aqueous solution of formaldehyde, an aqueous solution of an acid hardening agent and a surfactant together at a temperature of about 50° C. and aerating the resulting solution during said mixing to produce a froth, said urea solution having a molar ratio with respect to said formaldehyde solution of about 2.17, and said aqueous solution of phosphoric acid hardening agent having a phosphoric acid concentration of about 1 M and having a volume in a ratio with respect to the combined volume of said urea and formaldehyde solutions of from about 1:0.60 to about 1:1.4, and subjecting such acidified froth to a temperature of from about 75° C. to about 100° C. to effect its gellation and cure.

8. A process for preparing an aminoplast resin foam comprising mixing urea and paraformaldehyde together with water to form a solution having urea in a molar ratio with respect to said formaldehyde of from about 1:2 to about 1:2.5, adding sufficient sodium hydroxide to said solution to give it a pH of from about 7 to about 8.5, adding a surfactant to said solution, aerating said solution while admixing therewith an acid hardening agent solution in a volume ratio with respect to said urea and paraformaldehyde solution of from about 1:0.60 to about 1:1.4 to produce a froth of polymerized urea-formaldehyde, and subjecting such acidified froth to a temperature of from about 75° C. to about 100° C. to effect its gellation and cure.

9. A process for preparing an aminoplast resin foam comprising mixing urea, paraformaldehyde, sodium hydroxide and ammonium hydroxide together with water at a temperature of about 50° C. to form a solution having an ammonia content in a ratio with respect to said urea less than about 0.5 to 1, said urea having a molar ratio with respect to said formaldehyde of from about 1:2 to about 1:2.5, the content of urea-formaldehyde material comprising from about 42% to about 50% of the total solution, aerating said solution while admixing therewith an aqueous solution of an acid hardening agent having a phosphoric acid concentration of from about 0.3 M to about 6 M and having a volume in a ratio with respect to the combined volume of said urea and formaldehyde solution of from about 1:0.60 to about 1:1.4 to produce a froth of polymerized urea formaldehyde, and subjecting said acidified froth to a temperature of from about 75° C. to about 100° C. to effect its gellation and cure.

10. A process for preparing an aminoplast resin foam comprising mixing urea, paraformaldehyde, sodium hydroxide and ammonium hydroxide together with water at a temperature of about 50° C. to form a solution having an ammonia content in a ratio with respect to said urea less than about 0.15:1, said urea having a molar ratio with respect to said formaldehyde of from about 1:2 to about 1:2.5, the content of urea-formaldehyde material comprising from about 42% to about 50% of the total solution, aerating said solution while admixing therewith an aqueous solution of an acid hardening agent having a phosphoric acid concentration of from about 0.66 M to about 2 M and having a volume in a ratio with respect to the combined volume of said urea and formaldehyde solution of from about 1:0.60 to about 1:1.4 to produce a froth of polymerized urea formaldehyde, and subjecting said acidified froth to a temperature of from about 75° C. to about 100° C. to effect its gellation and cure.

References Cited

UNITED STATES PATENTS

| | | | |
|---|---|---|---|
| 2,076,295 | 4/1937 | Curs et al. | 260—2.5 |
| 2,384,387 | 9/1945 | Meyer | 260—2.5 |
| 2,559,891 | 7/1957 | Meyer | 260—2.5 |
| 3,150,108 | 9/1964 | Vieli | 260—2.5 |

MURRAY TILLMAN, *Primary Examiner.*

M. FOELAK, *Assistant Examiner.*